July 14, 1925.
C. S. BARON
1,545,877
MOLASSES JUG AND TOP AND THE LIKE
Filed Jan. 16, 1923
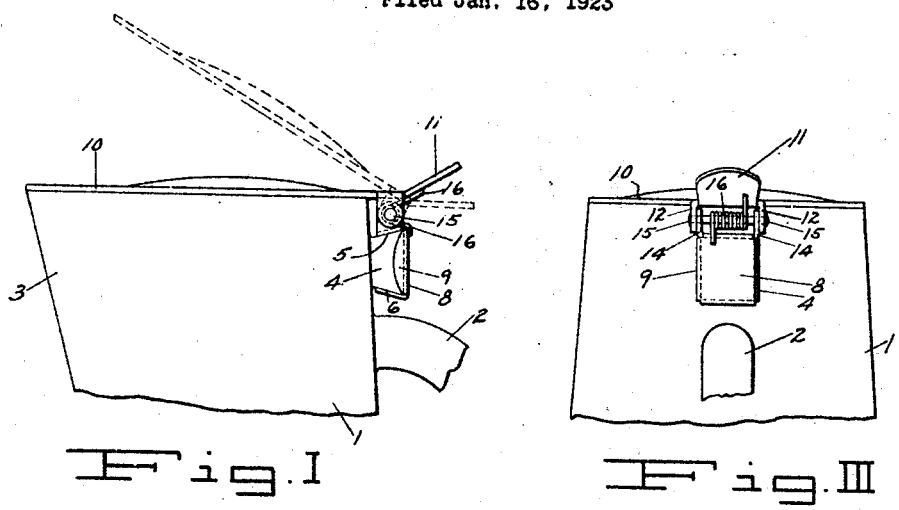
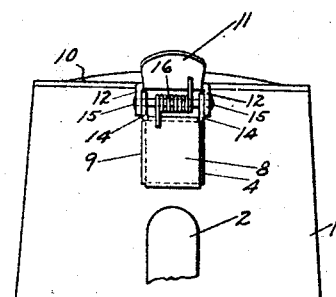
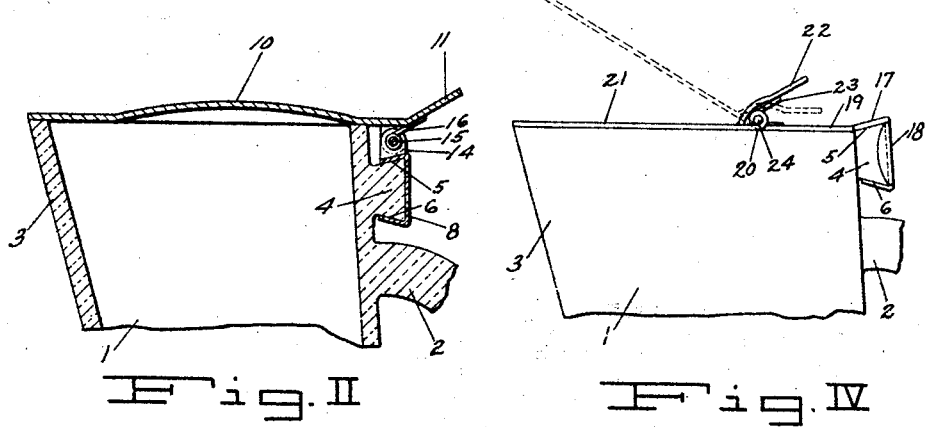
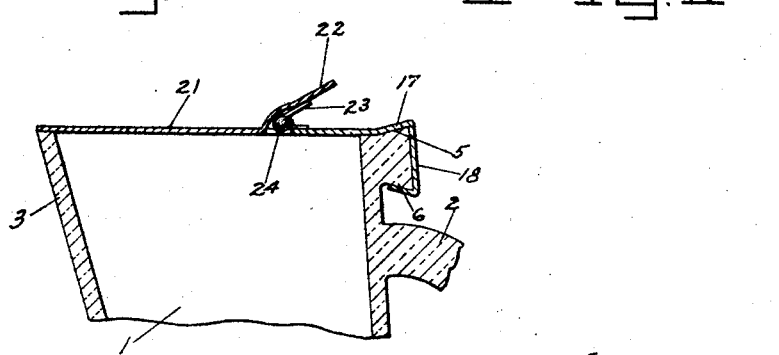
INVENTOR:
Charles S. Baron,
BY
Atkins & Atkins,
ATTORNEYS.

Patented July 14, 1925.

1,545,877

UNITED STATES PATENT OFFICE.

CHARLES S. BARON, OF TIFFIN, OHIO.

MOLASSES JUG AND TOP AND THE LIKE.

Application filed January 16, 1923. Serial No. 612,977.

*To all whom it may concern:*

Be it known that I, CHARLES S. BARON, a citizen of the United States of America, and resident of Tiffin, in the county of Seneca, in the State of Ohio, have invented certain new and useful Improvements in Molasses Jugs and Tops and the like, of which the following is a specification, reference being had to the accompanying drawing.

My invention relates generally to containers for liquids which are usually and preferably made of glass, and has for its main object the production of an article of the molasses jug type, which being durable, simple, and cheap, possesses a high degree of sanitary efficiency. Said article is provided with a top having a cover that may be conveniently and at will opened for discharge of the contents of the jug, and which, meantime, protects the same from contamination from without, as from intrusion of inanimate objects or of insects which, in certain warm localities and particularly at certain seasons, become very troublesome.

In devices of the class to which my invention belongs, a serious difficulty has been to combine a degree of cheapness necessary to make a commercial success with that closeness of closure between the container and its top or cover which is essential to its practical utility.

Various means have been devised for overcoming the difficulties alluded to in the last preceding paragraph, but by my present invention a distinctive, novel and positive means of union between the container and its top is attained whereby a substantially perfect closeness of closure between said elements is made available at comparatively small cost of production.

What constitutes my invention will be hereinafter described in detail and succinctly set forth in the appended claim.

In the accompanying drawing, wherein my invention is illustrated in present preferred form of embodiment, only, Figure I is a side elevation of the upper portion of a molasses jug with its cover, showing in full lines the cover in closed position, and showing it in dotted lines in the open position.

Figure II is a medial longitudinal vertical section of the subject matter of Figure I.

Figure III is a rear elevation of the subject matter illustrated in full lines in Figure I.

Figure IV is a view similar to Figure I showing a modification of my invention.

Figure V is a view of the same corresponding to Figure II.

Referring to the numerals on the drawing, 1 indicates, by way of example of any suitable liquid container, a molasses jug which is usually and preferably made of glass, whereof the limitations in respect to manufacture impose certain practical restrictions upon the shape and construction that may be made available in articles generally of the class to which my invention belongs.

The container 1 is provided with the usual or preferred handle 2, and spout 3. Above the handle 2, I provide a projection 4 which is preferably made integrally with the body of the container of which it forms a part. It is distinctive in that it has opposite inclined or dovetailing edges 5 and 6 which are transversely disposed to the longitudinal axis of the container. By this construction for example, provision is made for the accommodation on the projection 4 of a transversely sliding member 8 for uniting the container and its cover, with positive means for holding the cover against the upper edge of the container, and for holding it against displacement thereon towards front or rear.

Accidental lateral displacement in one direction may be positively prevented by a stop-piece 9 on one end of the member 8, and in the opposite direction it may be eliminated to all practical purposes by sufficient snugness of fit between the member 8 and the projection 4, those parts being slidingly united, as specified for example, by a dovetail union between them.

In Figures I to III, inclusive, a cover 10 is shown as extending entirely over the open mouth of the container 1. The cover 10 is shown as provided with a rearwardly extending thumb-piece 11. A hinge connection between the cover and the member 8 is provided as by means of parallel depending lugs 12 upon the member 11 disposed outside a pair of ears 14, upstanding from the top of the member 8. The members 12 and 14 are hinged together by a pintle 15. A spring is also provided for keeping the cover 10 normally closed, and it is preferably in the form of a coiled spring 16, disposed about the pintle 15 and having its opposite ends in operative engagement with the member 8 and cover 10, respectively, so as to keep the cover yieldingly closed.

In the construction last above described, the projection 4 must be set sufficiently low down on the container to afford space for the accommodation above it of the members 12 and 14.

In the modification shown in Figures IV and V, the projection 4 may be identical with that member as shown in the preceding figures, except that it is set higher upon the container 1, its upper edge being substantially in the same plane with the mouth-defining edge thereof. In the last named figure the upper wall 17 of the member, corresponding to the member 8 but distinguished therefrom for convenience by the reference numeral 18, is made integral with the cap 19 which extends partially across the open mouth of the container, with the rearward portion of whose edge the member 18 holds it in close contact. At the forward edge of the cap 19 it is provided with a hinge 20 which unites it to a movable cover-section 21, in a manner that is familiar in the art. The cover-section is provided with the usual thumb-piece 22 and actuating spring 23 coiled, for example, about the pintle 24 of the hinge 20.

The operation of my invention will, it is believed, be clear to one skilled in the art from the foregoing specification without additional description.

What I claim is:

The combination with a container provided with a mouth defining edge and having a projection of dovetail form in vertical cross section extending outward from a side wall, a cover adapted to close against the aforesaid edge, and a hinge connection between the cover and container including a member having integral parts shaped to closely embrace the top, bottom and outer vertical face of the said projection on the container body and to effectually prevent bodily vertical or lateral movement of the cover relative to the container.

In testimony whereof, I have hereunto set my hand in the presence of two subscribing witnesses.

CHARLES S. BARON.

Witnesses:
HARRY TAGGART,
N. E. MYERS.